W. P. HAMMOND.
METALLIC BELT PROTECTOR FOR VEHICLE TIRES.
APPLICATION FILED JUNE 30, 1908.
1,074,085.
Patented Sept. 23, 1913.
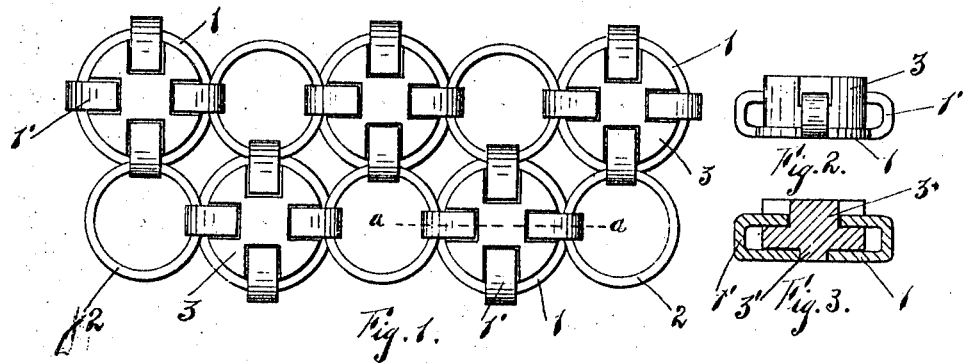
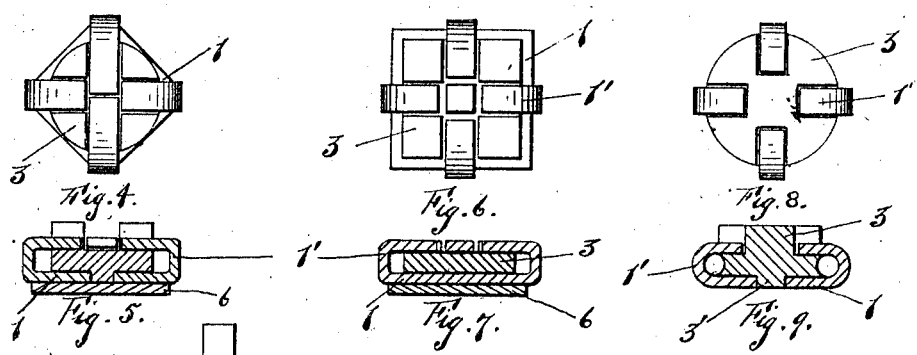
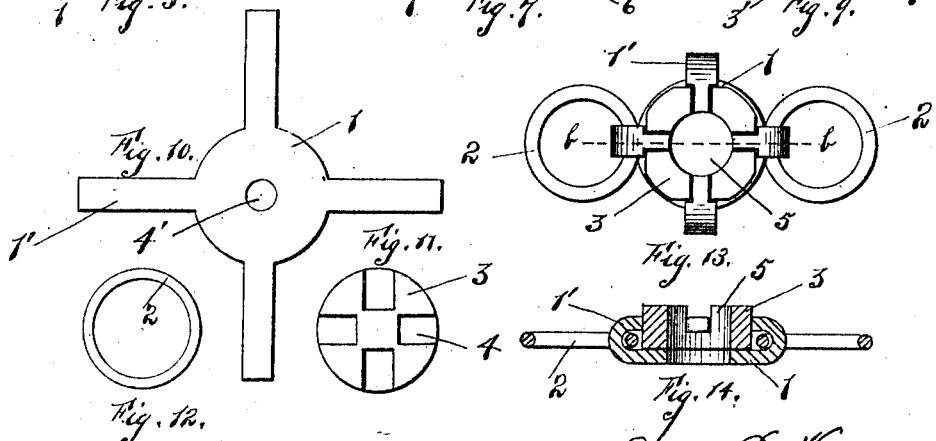
Witnesses:
William P. Hammond,
Inventor

UNITED STATES PATENT OFFICE.

WILLIAM P. HAMMOND, OF PASSAIC, NEW JERSEY, ASSIGNOR OF ONE-HALF TO P. FRANK SONNEK, OF WOODHAVEN, NEW YORK.

METALLIC-BELT PROTECTOR FOR VEHICLE-TIRES.

1,074,085.  Specification of Letters Patent.  Patented Sept. 23, 1913.

Application filed June 30, 1908. Serial No. 441,160.

*To all whom it may concern:*

Be it known that I, WILLIAM P. HAMMOND, a citizen of the United States, and a resident of the city and county of Passaic and State of New Jersey, have invented certain new and useful Improvements in Metallic-Belt Protectors for Vehicle-Tires, of which the following is a full, clear, and exact description.

One construction of metallic belt or protector designed to prevent skidding, slipping or puncturing of vehicle tires, with which I am familiar comprises a plurality of interlocked cup-shaped links and rings, constituting a complete metallic tire armor. In this form of belt specially constructed links are used having cup shaped or raised centers and a plurality of integral retaining fingers looped back and supported at their free ends by the raised center. The main objection to this form of link is that the retaining fingers which are relied upon to prevent slipping or skidding of the wheel are in contact with the road and receive all of the wear and consequently soon wear down and break. Another objection resides in the fact that the loops through which the connecting rings are interlocked are liable to be bent through violent contact with an obstruction thus binding the rings and destroying the flexibility of the belt. The cup-shaped center forming the support for the finger ends also forms a repository for dirt which I have found collects and is retained therein.

My invention comprehends a new form of link having ring retaining fingers that are entirely protected and are not subjected to any wear since they do not come in contact with the road-bed, a support for the finger ends provided with a plurality of calks which contact with the road bed and receive all of the wear, and which are capable of withstanding the severe strain and shock they are subjected to, and an air space extending centrally through the link to permit the air to freely circulate therethrough and keep the link from heating and certain other modifications which will be more fully understood from the following detailed description.

In the accompanying drawings in which I have illustrated practical embodiments of my invention like reference numerals indicate like parts throughout the several views.

Figure 1 is a plan view of a section of belt comprising one form of my improved link. Fig. 2 is a view in side elevation of this particular form. Fig. 3 is a sectional view thereof taken on line *a—a* Fig. 1. Figs. 4 to 9 are plans and sectional views of further modified forms of my link. Figs. 10 to 12 are structural details of one form of my link. Fig. 13 is a plan view of the preferable form of my improved link and Fig. 14 a sectional view thereof taken on line *b—b*.

The belt or protector comprises links 1 and rings 2 interlocked as shown, to form a continuous metallic belt of sufficient size to encircle the outer periphery or tread of a vehicle tire. The links 1 may be described as consisting of a light but strong metal stamping or bed plate having retaining fingers or loops 1' formed integrally therewith and bent or looped back to form a retainer for the rings 2 with which they are interlocked and a support 3 which may be a drop forging of toe-calk or cold chilled steel provided with a plurality of radial slots 4 into which the ends of the retaining fingers are bent, said slots forming upon the surface of the support a plurality of roughing calks or gripping surfaces. It will be apparent that when the fingers 1' are looped and the ends bent down into the slots 4 which is done after the connecting rings 2 are threaded thereon, the support will be firmly held against any displacement by the retaining fingers.

The bed plate and support may be made in various different forms or shapes of which those illustrated in the drawing are a few. In Figs. 1 to 3, I have shown a perforated circular stamping or bed plate and a cylindrical support having a projection 3' fitting into the perforation 4' (see Figs. 3 and 10). In Figs. 4 and 5 I have extended the slots 4 diametrically through the cylindrical support, forming two of the retaining fingers 1' longer than the other so that they will approximately meet at the center. This form has the advantage of providing increased gripping power for the support. In Figs. 6 and 7 I form the bed plate and support hexagonal, and in this form of structure it will be noticed that the outer surfaces of the retaining fingers are on the same plane with roughing calks of the support so that the wear will come upon both the retaining fingers and the roughing calks equally. In Figs. 8 and 9 the fingers are looped annularly and the support is grooved or cut out similarly so as to form an annular bearing for the connecting ring.

Referring to Figs. 13 and 14 in which I have shown my preferred structure, it will be noticed that I provide a large central air space or perforation 5 extending through the bed plate and support so that the air may circulate therethrough and keep the metal from unduly heating. This enlarged opening through the center of the link will not accumulate and retain dirt as the centrifugal force created by the running car will dislodge and throw it out should it be picked up or caught therein when in contact with the road-bed. Other advantages of providing this opening over the other forms of links shown are that the weight of link is materially reduced as well as securing an increment in the gripping power of the roughing calks. It will be further observed that in this form of link, that the looped portions of the retaining fingers are enlarged thus strengthening them, and by reason of the shoulders formed by the reduced ends abutting the support it will be apparent that the same will be firmly held from lateral displacement.

In Figs. 5 and 7 I have shown an attaching pad 6 suitably fastened to that surface of the link that contacts with the pneumatic tire. This pad is made of asbestos or other good heat non-conducting material and is employed to keep the metal should it become excessively hot by reason of continued use on a hot day from directly contacting with the rubber.

Having thus described my invention what I claim herein as new and desire to secure by Letters Patent is:—

1. An apertured link for a metallic belt provided with a plurality of return bent loops and an apertured support for the free ends of said loops, said support extending above said ends.

2. A link for a metallic belt having a plurality of retaining members, a supporting member supporting the free ends of said retaining members, said supporting member extending above the plane of the retaining members.

3. A tire protector comprising perforated links and integral radially disposed loops, an apertured supporting member, supporting the ends of said loops, and links interlocked with said loops.

4. A tire protector having links provided with retaining members, a supporting member provided with radial slots, the free ends of said retaining members resting in said slots upon said supporting member and links interlocked with said retaining members.

5. A tire protector having links provided with retaining members, said retaining members having reduced ends, a slotted supporting member adapted to receive the reduced ends of said retaining members, said links being provided with a central perforation and links interlocked with said retaining members.

6. An apertured link having a plurality of fingers formed integral therewith, and an apertured support for the free ends of said fingers.

7. In a tread attachment for tire chains, a plate provided with projecting wearing members, a link having its outer face adapted to receive and support the plate and having its side edges bent upward and inward over the side edges of the plate so as to form retaining lips therefor, said link being also provided with a tongue bent to interlock with an adjacent link and having its end bent into contact with an edge of the plate.

8. In a tread attachment for tires, a cross-chain having its center link formed with a relatively broad central portion having relatively narrow tongues extending therefrom bent to interlock with adjacent links and having its side edges bent upward and inward to form retaining lips, and a plate provided with projecting wearing members carried by the central portion of the link and secured thereto by the retaining lips.

In witness whereof I have hereunto set my hand in the presence of two subscribing witnesses.

WILLIAM P. HAMMOND.

Witnesses:
 E. C. RYDER,
 P. FRANK SONNEK.